United States Patent [19]

Yamasaki et al.

[11] Patent Number: 4,468,955

[45] Date of Patent: Sep. 4, 1984

[54] CHASSIS DYNAMOMETER

[75] Inventors: Toshihiro Yamasaki, Kobe; Kensaku Jinbo, Akashi, both of Japan

[73] Assignee: Mitsubishi Denki Kabushiki Kaisha, Tokyo, Japan

[21] Appl. No.: 393,089

[22] Filed: Jun. 28, 1982

[30] Foreign Application Priority Data

Jun. 26, 1981 [JP] Japan ................................. 56-100155

[51] Int. Cl.³ ............................................. G01L 5/13
[52] U.S. Cl. ......................................................... 73/117
[58] Field of Search ................. 73/117, 124, 127, 123, 73/126; 74/14

[56] References Cited

U.S. PATENT DOCUMENTS

| | | | |
|---|---|---|---|
| 1,902,718 | 3/1933 | Patterson | 73/127 |
| 2,749,747 | 6/1956 | Cline | 73/117 |
| 3,180,138 | 4/1965 | Handley | 73/117 |
| 3,491,587 | 1/1970 | Morris et al. | 73/117 |
| 3,613,438 | 10/1971 | Esau | 73/117 X |
| 3,826,129 | 7/1974 | Wiss | 73/117 |
| 3,861,204 | 1/1975 | Fillingim | 73/117 |
| 3,940,978 | 3/1976 | Akkermen et al. | 73/117 |
| 4,077,255 | 3/1978 | Murakomi | 73/117 |
| 4,216,710 | 8/1980 | Asmus | 73/117 X |

FOREIGN PATENT DOCUMENTS 40901  4/1978  Japan ................................. 73/117

*Primary Examiner*—Jerry W. Myracle
*Assistant Examiner*—Tom Noland
*Attorney, Agent, or Firm*—Wenderoth, Lind & Ponack

[57] ABSTRACT

A chassis dynamometer allows operators to conduct running tests on vehicles such as new automotive vehicles in a laboratory or workshop. A pair of rolls and a dynamometer connected to one another are mounted on a chassis so that the overall assembly is movable to reduce the test space and to allow operators to change the setting of the chassis dynamometer to suit the type and size of the vehicle in a short period of time.

4 Claims, 6 Drawing Figures

CHASSIS DYNAMOMETER

BACKGROUND OF THE INVENTION

1. Field of the Invention

This invention relates to a chassis dynamometer for testing vehicles such as new automobiles in a workshop under normal driving conditions.

2. Description of the Prior Art

FIGS. 1 and 2 illustrate an example of the conventional chassis dynamometers. In this Figures, the numeral 1 denotes rolls, and the numeral 2 denotes a dynamometer connected by a common shaft to the rolls 1. The numeral 3 denotes a base on which the rolls 1 and the dynamometers 2 are mounted. The numeral 4 denotes a vehicle being tested. The numeral 5 denotes a vehicle fastening device. The numeral 6 denotes an engine cooling blower movable in accordance with occasional vehicle positions.

The chassis dynamometer thus constructed operates as follows. The rolls 1 are rotary drums simulating the road surface. The vehicle 4 is locked by the fastening device 5 against fore and aft movement to simulate actual running conditions on the road surface. The driving power of the vehicle 4 is transmitted to the rolls 1 as a rotational force which is transmitted to the dynamometer 2 connected on the same base 3 so that the loadings of the vehicle 4 are absorbed by the dynamometer 2. The loadings on the dynamometer 2 may be equated to those actually met when the vehicle travels on the road so that vehicle running tests can be conducted in a laboratory or workshop without the necessity of actually driving the vehicle.

It is usually desired that the chassis dynamometer mentioned above should be usable not only with a specific vehicle type but also with various vehicle sizes or models subject to a simplified setting procedure.

In the conventional chassis dynamometers mentioned above, when the type of the vehicle to be tested is changed from the front engine front wheel drive vehicle 4a (hereafter mentioned as a F/F vehicle) shown in FIG. 3a to the front engine rear wheel drive vehicle 4b (hereafter mentioned as a F/R vehicle) shown in FIG. 3b, the drive wheel positions on the rolls 1 differ with the F/F vehicle 4a and the F/R vehicle 4b, as shown in FIGS. 3(a) and (b), so that the vehicle positions also differ markedly with different vehicle types, thus making it necessary to provide a spacious laboratory and change the position of the engine cooling blower 6 with different vehicle types. This is inconvenient because the construction of the laboratory may be expensive and a lot of operational time may be involved in changing the setting from F/F vehicles 4a to F/R vehicles 4b and vice versa.

SUMMARY OF THE INVENTION

This invention has been made to eliminate the defects of the prior art device mentioned above and contemplates providing a chassis dynamometer in which a pair of rolls and a dynamometer are coupled to one another and mounted on a chassis and the overall assembly is adapted to be movable for reducing the laboratory space and allowing operators to make setting operations for various types and sizes of the vehicles in a short period of time.

BRIEF DESCRIPTION OF THE DRAWINGS

In the drawings, the same numerals denote same or equivalent parts.

DETAILED DESCRIPTION OF THE PREFERRED EMBODIMENTS

Figure 1:
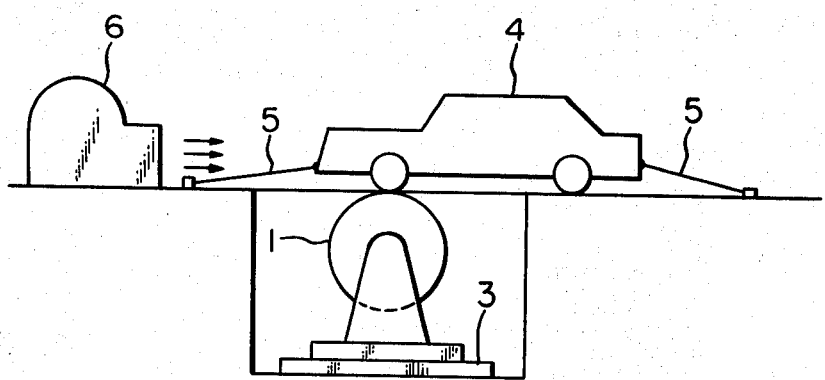
FIG. 1 is a schematic side elevation of the conventional chassis dynamometer.
Figure 2:
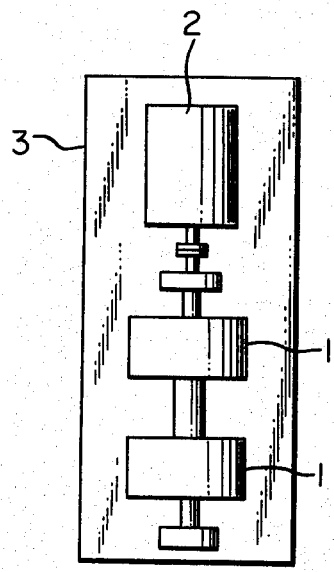
FIG. 2 is a plan view of FIG. 1.
Figure 3A:
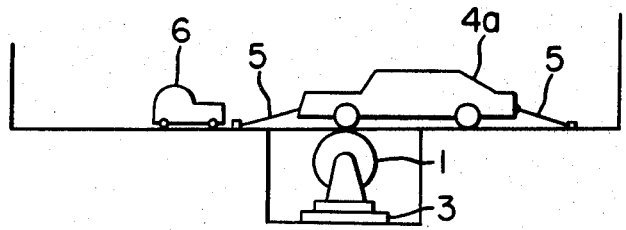
FIG. 3(a) is a schematic side elevation showing the test status for a front engine front wheel drive vehicle with the use of the conventional chassis dynamometer shown in FIGS. 1 and 2.
Figure 3B:
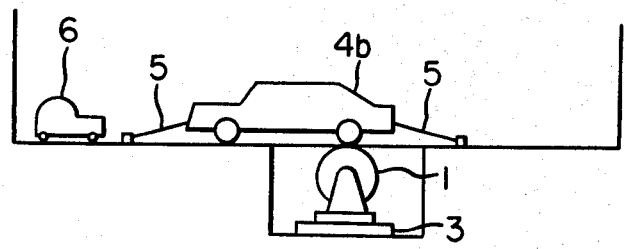
FIG. 3(b) is a schematic side elevation showing the test status for a front engine rear wheel drive vehicle with the use of the conventional chassis dynamometer shown in FIGS. 1 and 2.
Figure 4A:
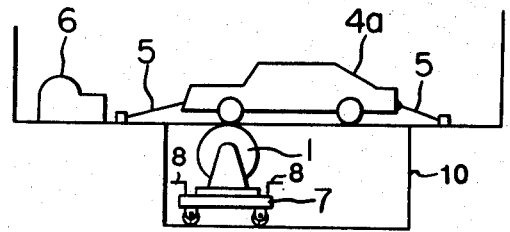
FIG. 4(a) is a schematic side elevation showing the test status for a front engine rear wheel drive vehicle with the use of a chassis dynamometer according to the present invention.

In FIGS. 4(a) and (b) showing a preferred embodiment of the present invention, the numeral 1 denotes rolls connected by a common shaft to a dynamometer not shown in these Figures. These rolls 1 and the dynamometer are installed on a movable chassis 7. In these Figures, the numeral 4a denotes an F/F vehicle, the numeral 4b an F/R vehicle, the numeral 5 a vehicle fastening device, and the numeral 6 an engine cooling blower.

Figure 4B:
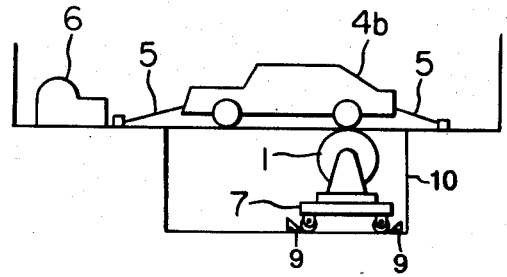
FIG. 4(b) is a schematic side elevation showing the test status for a front engine rear wheel drive vehicle with the use of a chassis dynamometer according to the present invention.

The fixed chassis dynamometer, so far shown and described, operates as follows. When an F/F vehicle 4a is tested as shown in FIG. 4(a), the chassis 7 is moved to a design position in a pit 10, wherein the rolls 1 and the dynamometer mounted on the movable chassis 7 are positioned towards the engine cooling blower 6 to complete the preparatory or setting operation for testing the F/F vehicle 4a. The vehicle 4a is advanced to a position such that the front wheels, i.e. the drive wheels, rest on the rolls 1, and the vehicle is then secured by the fastening device 5 against movement in the fore and aft direction. Then, the vehicle 4a is tested as conventionally for various test items. When an F/R vehicle 4(b) is tested as shown in FIG. 4(b), the rolls 1 and the dynamometer are moved backwards by the chassis 7 to another design position opposite to the engine cooling blower 6, and the F/R vehicle 4b is advanced to a position such that the rear wheels thereof rest on the rolls 1. Then, the vehicle 4b is secured by the fastening device 5 and tested as conventionally for various test items.

According to the present invention, the chassis dynamometer may be moved manually or automatically with the aid of an electric, a pneumatic, or a hydraulic drive system. After setting the chassis to the design position, the chassis can be made immovable by locking means 8 for the chassis wheels, shown schematically in FIG. 4(a), or with the aid of a suitable stopper 9 provided to the chassis, as shown schematically in FIG. 4(b).

According to the present invention mentioned above, the rolls 1 and the dynamometer are mounted on the movable chassis 7 and made to be movable therewith so that the vehicle 4a or 4b can be set to substantially the same position in the test space no matter whether the vehicle is the F/F vehicle 4a or the F/R vehicle 4b. In this manner, the two-level test space may be reduced, while the operational time necessary for vehicle setting may also be reduced when the size or type of the vehicle 4a or 4b being tested is changed, resulting in markedly improved test time efficiency. Besides, the engine cooling blower 6 need not be movable but may be fixed with a resulting cost saving. In addition, when the F/F vehicles 4a or F/R vehicles 4b with different wheel bases are tested, there is no necessity for displacing the blowers 6 or vehicle fastening devices 5.

What is claimed is:

1. A fixed system for testing front engine front drive and front engine rear drive vehicles with a chassis dynamometer, said system including,
   a test space having a first level and a pit thereunder with its bottom on a second lower level;
   rolls positioned in the pit and adapted to contact with drive wheels of a vehicle which is standing still on the first level,
   a dynamometer positioned in the pit and coupled to a a common shaft for said rolls, and
   an engine cooling blower positioned in front of the vehicle on the first level,
   wherein the improvement comprises:
   a chassis which is movable back and forth along the bottom of the pit and upon which said rolls and the dynamometer are mounted,
   whereby the vehicle may be tested in substantially the same standing still position in the test space no matter whether the vehicle is front engine front drive or front engine rear drive.

2. The fixed system as claimed in claim 1 further comprising:
   wheel means, attached to the underside of the chassis, for moving the chassis back and forth.

3. The fixed system as claimed in claim 1 further comprising:
   wheel means, attached to the underside of the chassis, for moving the chassis back and forth, said wheels having means for locking said wheels in a stopped position.

4. The fixed system as claimed in claim 1 further comprising:
   means for stopping said chassis in a stopped position.

* * * * *